US012617000B2

(12) United States Patent
Torrione

(10) Patent No.: US 12,617,000 B2
(45) Date of Patent: May 5, 2026

(54) SYSTEM AND METHOD FOR ESTIMATING DAMAGE TO A SHAKER TABLE SCREEN USING COMPUTER VISION

(71) Applicant: Helmerich & Payne Technologies, LLC, Tulsa, OK (US)

(72) Inventor: Peter A. Torrione, Durham, NC (US)

(73) Assignee: Helmerich & Payne Technologies, LLC, Tulsa, OK (US)

( * ) Notice: Subject to any disclaimer, the term of this patent is extended or adjusted under 35 U.S.C. 154(b) by 0 days.

(21) Appl. No.: 18/506,919

(22) Filed: Nov. 10, 2023

(65) Prior Publication Data

US 2024/0075501 A1 Mar. 7, 2024

Related U.S. Application Data

(63) Continuation of application No. 15/251,994, filed on Aug. 30, 2016, now Pat. No. 11,850,631.
(Continued)

(51) Int. Cl.
*B07B 1/42* (2006.01)
*B07B 1/46* (2006.01)
(Continued)

(52) U.S. Cl.
CPC .................. *B07B 1/42* (2013.01); *B07B 1/46* (2013.01); *B07B 1/4627* (2013.01); *B07B 1/55* (2013.01);
(Continued)

(58) Field of Classification Search
CPC ........... B07B 1/42; B07B 1/46; B07B 1/4627; B07B 1/55; B07B 13/18; B07B 2230/01; E21B 21/065
See application file for complete search history.

(56) References Cited

U.S. PATENT DOCUMENTS 4,610,005 A 9/1986 Utasi
6,469,734 B1 10/2002 Nichani et al.
(Continued)

FOREIGN PATENT DOCUMENTS

CA 2825328 A1 * 9/2011 ............... B07B 1/46
CN 102621150 A 8/2012
(Continued)

OTHER PUBLICATIONS

CA-2825328-A1, Machine Translation. (Year: 2023).*
(Continued)

*Primary Examiner* — Binh X Tran
*Assistant Examiner* — Christopher Remavege
(74) *Attorney, Agent, or Firm* — Kilpatrick Townsend & Stockton LLP

(57) ABSTRACT

A system for cleaning, repairing, and/or replacing damaged shaker screens is disclosed. The system may comprise a shale shaker with a replaceable shaker screen, at least one camera, and a computer processor. The camera is positioned to capture images of the shale shaker screen and the processor is capable of receiving said images from the camera. The processor is configured to analyze the images and detect damaged regions of the shale shaker screen. The processor is also configured to determine when a screen is damaged above a predefined threshold. Certain embodiments allow for the automatic cleaning, repair, and/or replacement of the shaker screen.

25 Claims, 6 Drawing Sheets

Related U.S. Application Data

(60) Provisional application No. 62/212,207, filed on Aug. 31, 2015.

(51) Int. Cl.
*B07B 1/55* (2006.01)
*B07B 13/18* (2006.01)
*E21B 21/06* (2006.01)

(52) U.S. Cl.
CPC ............ *B07B 13/18* (2013.01); *E21B 21/065* (2013.01); *B07B 2230/01* (2013.01)

(56) References Cited

U.S. PATENT DOCUMENTS

| | | | | |
|---|---|---|---|---|
| 6,728,417 | B1 | 4/2004 | Hara et al. | |
| 7,058,237 | B2 | 6/2006 | Liu et al. | |
| 7,874,351 | B2 | 1/2011 | Hampton et al. | |
| 7,909,170 | B2 | 3/2011 | Jones et al. | |
| 7,933,166 | B2 | 4/2011 | Goodman | |
| 8,218,826 | B2 | 7/2012 | Ciglenec et al. | |
| 8,224,122 | B2 | 7/2012 | Cohen et al. | |
| 8,233,667 | B2 | 7/2012 | Helgason et al. | |
| 8,363,101 | B2 | 1/2013 | Gschwendtner et al. | |
| 8,395,661 | B1 | 3/2013 | Olsson et al. | |
| 8,547,428 | B1 | 10/2013 | Olsson et al. | |
| 8,622,128 | B2 | 1/2014 | Hegeman | |
| 8,812,236 | B1 | 8/2014 | Freeman et al. | |
| 8,873,806 | B2 | 10/2014 | Kiest, Jr. | |
| 9,041,794 | B1 | 5/2015 | Olsson et al. | |
| 9,134,255 | B1 | 9/2015 | Olsson et al. | |
| 9,279,319 | B2 | 3/2016 | Savage | |
| 9,410,877 | B2 | 8/2016 | Maxey et al. | |
| 9,464,492 | B2 | 10/2016 | Austefjord et al. | |
| 9,518,817 | B2 | 12/2016 | Baba et al. | |
| 9,651,468 | B2 | 5/2017 | Rowe et al. | |
| 9,664,011 | B2 | 5/2017 | Kruspe et al. | |
| 9,677,882 | B2 | 6/2017 | Kiest, Jr. | |
| 9,706,185 | B2 | 7/2017 | Ellis | |
| 9,869,145 | B2 | 1/2018 | Jones et al. | |
| 9,912,918 | B2 | 3/2018 | Samuel | |
| 9,915,112 | B2 | 3/2018 | Geehan et al. | |
| 10,227,859 | B2 | 3/2019 | Richards et al. | |
| 10,328,503 | B2 | 6/2019 | Osawa et al. | |
| 10,577,912 | B2 | 3/2020 | Torrione | |
| 2008/0144968 | A1 | 6/2008 | Cohen et al. | |
| 2009/0159294 | A1 | 6/2009 | Abdollahi et al. | |
| 2010/0192676 | A1* | 8/2010 | Bowen | B07B 1/54 73/38 |
| 2011/0180107 | A1* | 7/2011 | Dahl | B07B 1/55 134/18 |
| 2011/0273528 | A1 | 11/2011 | Sazawa | |
| 2013/0013100 | A1 | 1/2013 | Dahl | |
| 2013/0236064 | A1 | 9/2013 | Li et al. | |
| 2013/0265409 | A1 | 10/2013 | Tjhang et al. | |
| 2013/0275100 | A1 | 10/2013 | Ellis et al. | |
| 2014/0002617 | A1 | 1/2014 | Zhang et al. | |
| 2014/0138323 | A1* | 5/2014 | Jones | B25J 11/00 210/324 |
| 2014/0326505 | A1 | 11/2014 | Davis et al. | |
| 2014/0333754 | A1 | 11/2014 | Graves et al. | |
| 2015/0138337 | A1 | 5/2015 | Tjhang et al. | |
| 2015/0218936 | A1 | 8/2015 | Maher et al. | |
| 2017/0089153 | A1 | 3/2017 | Teodorescu | |
| 2017/0161885 | A1 | 6/2017 | Parmeshwar et al. | |
| 2017/0167853 | A1 | 6/2017 | Zheng et al. | |
| 2017/0322086 | A1 | 11/2017 | Luharuka et al. | |
| 2018/0171731 | A1* | 6/2018 | Bingham | B07B 1/4681 |
| 2018/0180524 | A1 | 6/2018 | Francois et al. | |
| 2019/0100988 | A1 | 4/2019 | Ellis et al. | |
| 2019/0102612 | A1 | 4/2019 | Takemoto et al. | |
| 2019/0136650 | A1 | 5/2019 | Zheng et al. | |
| 2019/0141294 | A1 | 5/2019 | Thorn et al. | |
| 2019/0206068 | A1 | 7/2019 | Stark et al. | |

FOREIGN PATENT DOCUMENTS

| | | | | |
|---|---|---|---|---|
| WO | WO-2014063251 | A1 * | 5/2014 | B01D 33/00 |
| WO | 2016147045 | A1 | 9/2016 | |
| WO | 2017042677 | A1 | 3/2017 | |
| WO | 2017132297 | A2 | 8/2017 | |
| WO | 2017176689 | A1 | 10/2017 | |
| WO | 2018093273 | A1 | 5/2018 | |
| WO | 2018131485 | A1 | 7/2018 | |
| WO | 2018148832 | A1 | 8/2018 | |
| WO | 2018157513 | A1 | 9/2018 | |

OTHER PUBLICATIONS

U.S. Appl. No. 15/251,994, "Advisory Action", Jul. 30, 2020, 7 pages.

U.S. Appl. No. 15/251,994, "Final Office Action", Apr. 26, 2021, 21 pages.

U.S. Appl. No. 15/251,994, "Final Office Action", May 12, 2020, 15 pages.

U.S. Appl. No. 15/251,994, "Non-Final Office Action", Jan. 20, 2023, 24 pages.

U.S. Appl. No. 15/251,994, "Non-Final Office Action", Jul. 7, 2022, 24 pages.

U.S. Appl. No. 15/251,994, "Non-Final Office Action", Oct. 7, 2020, 15 pages.

U.S. Appl. No. 15/251,994, "Notice of Allowance", Aug. 9, 2023, 9 pages.

* cited by examiner

SYSTEM AND METHOD FOR ESTIMATING DAMAGE TO A SHAKER TABLE SCREEN USING COMPUTER VISION

CROSS-REFERENCES TO RELATED APPLICATIONS

This application is a continuation of U.S. patent application Ser. No. 15/251,994, filed Aug. 30, 2016, which claims the benefit of U.S. Provisional Patent Application No. 62/212,207 filed Aug. 31, 2015, each of which is incorporated by reference herein in its entirety.

FIELD OF THE INVENTION

The invention relates to systems and methods that use computer vision for estimating the damage done to a shaker table screen.

BACKGROUND OF THE INVENTION

Shale shakers are an integral part of drilling operations, often used to separate drilling fluids from particulate matter returning up the well-bore. A shale shaker typically consists of a "shaker table", which may be a permanent fixture on the rig, and "shaker screens" which are typically replaceable and/or repairable parts that fit on the table. The shaker table is responsible for shaking the screens, and the screens are usually in direct contact with the drilling fluid and particle matter. Proper filtering of solids from drilling fluids may lessen the environmental impact of drilling, reduce costs, and result in efficient operations.

Since they are in direct contact with the shaker fluids and particles, shaker screens are often clogged, damaged, and/or destroyed as they are used. Typically, this damage accumulates over time in the form of rips and tears in the shaker screen material. As drilling progresses, the screens are periodically cleaned, and generally rig personnel are responsible for venturing down near the shakers and visually inspecting the screens to determine when a screen needs to be replaced. This process is usually time-consuming, expensive, and/or subject to each individual's opinion about what constitutes a sufficiently damaged screen.

To reduce the amount of time required for analysis, a video stream could be used to show an operator the clean shaker screen, but inter-operator variability would persist. Accordingly, there is a need for an automated computer vision based technique for observing and estimating the amount of damage on a shaker screen. This will, for example, enable automated determination of the optimal time to replace shaker screens. In turn, this may result in improved efficiency and/or reduced costs.

DETAILED DESCRIPTION OF THE INVENTION

Figure 1:
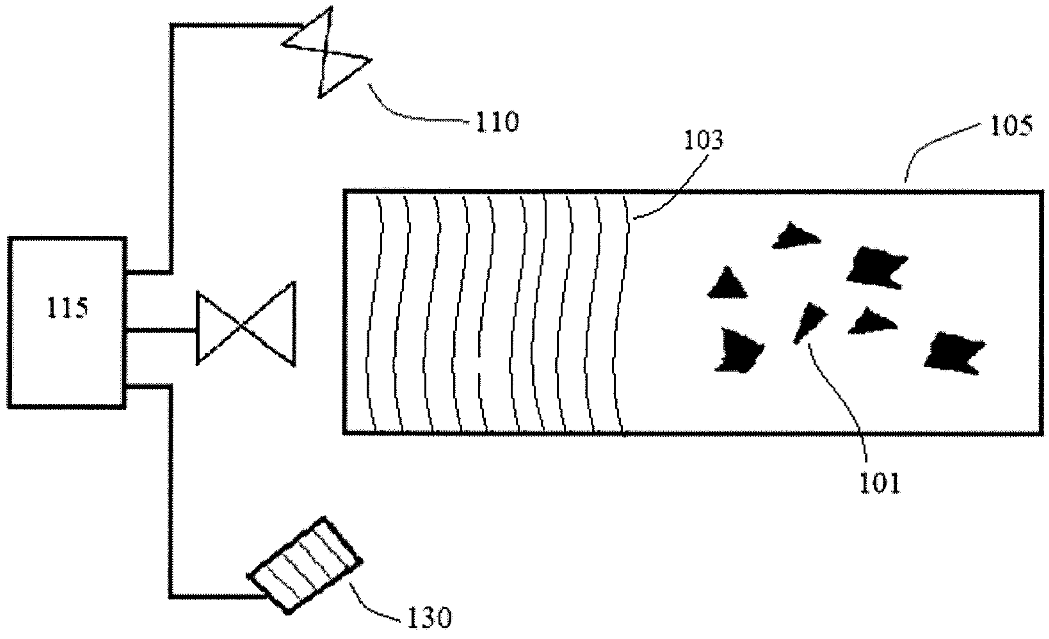
FIG. 1 a potential embodiment of the system using multiple cameras and distance sensing equipment.

A preferred embodiment of the Shaker Damage Estimation System (SDES) may consist of a number of the following components. (1) A high-shutter-speed camera 110 placed in a position to see the shaker screen 125 during and/or immediately after shaker screen cleaning. (2) A light source 120 co-located with the camera 110 which provides adequate illumination of the shaker 105 when desired. (3) A processor 115 and computer vision program for detecting damage on a shaker screen 125 and/or, for example, estimating the percentage of the screen 125 that is damaged and/or other parameters. (4) A system for determining when a shaker screen 125 needs to be cleaned, replaced, and/or repaired based upon, for example, the percent of the screen 125 that is clogged and/or damaged and/or potentially other factors (e.g., one particularly large, damaged region or key portion impaired). (5) A system for providing an alert to the rig operator indicating that the screens 125 need to be cleaned, changed, and/or repaired.

Disclosed embodiments will typically be used in combination with a well circulation system 200. A typical well circulation system 200 utilizes drilling mud or another liquid which may be pumped from a mud pit into a well bore. The mud is used to cool the drilling equipment as well as carry cuttings 101 up to the surface and deposit the cuttings 101 on a shaker table 105 and shaker table screen 125. The screen 125 separates the cuttings 101 and other particulate from the drilling fluid, which generally flows through the screen 125. The level of mud in the pit may be detected using a pit volume sensor 220. The flow of mud entering the well bore may be detected using a well flow-in sensor 210. The flow of mud exiting the well may be detected using a well flow-out sensor 215. The depth of the drill bit may be detected using a bit depth sensor 225. The information gathered by these sensors and various combinations of this information may be used in order to provide a, better understanding of the drill cutting characteristics and potential well conditions to an operator.

As the screen 125 becomes clogged or damaged, the screen 125 and shaker table 105 will become less efficient at separating the particulate from the drilling fluid. The screen 125 may be cleaned periodically in order to maintain screen efficiency but over time, the screen 125 will need to be replaced.

Shaker screens 125 are typically cleaned using pressurized water although a variety of known methods may be used. The screen 125 may be cleaned manually or, preferably, using an automated system 420. When the screen 125 is clean, disclosed embodiments will be more able to determine the overall damage of the shale shaker screen 125. Automated screen cleaning systems 420 may involve at least one or a plurality of pressurized spray nozzles which spray water or another liquid at the screen 125 in order to clean it. Other automated screen cleaning systems 420 may utilize brushes or pressurized air in order to clean the system. The nozzles used may be stationary or may be moved using an automated mounting system. If a plurality of nozzles is used, the automated system 420 may be able to more adequately clean the entire screen without utilizing movable spray nozzles. If a single nozzle is used, it will likely need to be movable in order to adequately clean the entire surface of the screen 125. In some embodiments, only a portion of the screen 125 will need to be cleaned in order to realize significant benefit from the automated screen cleaning system 420. In some embodiments, the automated screen cleaning system 420 will activate periodically. The screen cleaning system 420 may activate as often as daily, every 12 hours, every 6 hours, every 3 hours, every hour, every 30 minutes, or every 15 minutes depending on the conditions of the well, the type of drilling fluid being used, the type of drill cutting 101 that are being produced, the amount of water or other fluid used by the cleaning system 420, and many other factors.

Disclosed embodiments allow the angle and speed of the shaker table 105 to be adjusted in response to information compiled by the processor 115. Traditionally, a human would be required to monitor the shale shaker 105 periodically. There could be hours in between each individual observation performed by the human operator. The angle of some traditional shaker tables could be manually adjusted if the human operator determined that angle adjustment was necessary. Disclosed embodiments allow for observation of the shaker table 105 as often as every 5 minutes, 1 minute, 30 seconds, 10 seconds, 1 second, or substantially continuous monitoring. Disclosed embodiments also allow for adjustment of the angle and/or speed of the shale shaker 105 every 1 hour, 10 minutes, 5 minutes, 1 minute, 30 seconds, 10 seconds, 1 second, or substantially continuous adjustment of the shale shaker angle. This allows for maximizing the efficient use of the shaker table 105. This also prevents potentially devastating environmental impacts that can be caused when drilling fluid is allowed to run off the shaker table 105 due to inadequate adjustment of the angle and/or speed of the table 105 in response to changing conditions. Utilizing more frequent or nearly continuous monitoring and adjustment of shaker table angle and/or speed helps to prevent ecological damage and maintain the life of the shaker screens 125. Additionally, frequent monitoring and adjustment of the speed of the shaker table 105 may help to reclaim a higher percentage of the drilling fluid used in the well circulation system 200. By maintaining an ideal shaker speed, significant cost savings can be realized while minimizing the potential damage caused to the screen 125 by the drill cuttings 101. Disclosed embodiments may adjust the speed of the shaker table 105 through electronic, mechanical, or other appropriate controls of the motors responsible for vibrating the shale shaker. The angle of the shaker 105 may be adjusted using hydraulic, pneumatic, mechanical, or other known means for adjusting the angle of a shale shaker 105.

Disclosed embodiments may temporarily adjust the angle of the shaker table 105 in order to disrupt the position of the fluid front 103. Under typical operations, a portion of the screen 125 will be covered by drilling fluid. The border where the screen 125 becomes visible is typically referred to as the fluid front 103. Periodically the angle of the shaker table 105 may be adjusted so that the typically submerged portion of the shaker screen 125 becomes visible in order to allow the disclosed system to capture images of the entire screen 125. This angle adjustment may be coordinated with automated cleaning of the screen 125 in order to optimize the condition of the screen 125 for inspection by the system.

Disclosed embodiments include many possible types and combinations of cameras 110. For example, optical or video cameras, single or multi-stereo-cameras, IR, LIDAR, RGB-D cameras, or other recording and/or distance sensing equipment 130 may all be used, either alone or in combination. DSLR and other suitable cameras 110 may also be used. Preferably at least one high-shutter-speed digital camera, configured to capture images of the shale shaker 105 will be used. Each camera 110 or combination of cameras and sensors may be used to track the damage of a shaker screen 125. Information from the cameras 110 and/or sensors may also be combined with information from the circulation system 200 (e.g., flow-in, flow-out, and pit-volume) to modify the system's behavior as desired.

Cameras (optical, IR, RGB-D, single, stereo, or multi-stereo among others) 110 may be mounted in any configuration around the shaker table 105. In many embodiments, the cameras 110 will be mounted within pre-defined constraints around the shaker table 105. In one embodiment, camera 110 orientations are approximately 45 degrees to the shaker table 105, but cameras 110 may be placed anywhere with a view of the shaker table screen 125. This may include from 0 degrees to 180 degrees pitch. When using a single camera 110, it may be preferable to place the camera 110 within a range of 60 degrees to −60 degrees of vertical. The camera 110 may be configured to capture a view from above, oriented approximately down at the top of the shaker 105.

In some embodiments, multiple cameras 110 may be placed in mutually beneficial locations. As an example, stereo vision approaches may improve estimation of screen damage and tear size. Stereo cameras 110 typically view the same scene from approximately the same angle but from different spatial locations. Alternatively, cameras 110 viewing the same scene from different angles, such as a front view, side angle view, and/or overhead view may provide different views of the same image and may reduce the need to rely on assumptions. Additionally, when using multiple cameras 110, the preferred placement may depend on the shape, size, design, speed, and/or model of the shaker 105, shaker screen 125, drilling conditions, drilling fluid, and/or the configuration of sensors under consideration. Preferably, multiple camera 110 placements may be configured to provide additional information from each camera or sensor as discussed.

Many disclosed embodiments will comprise a light source 120. Cameras 110 may be equipped with a flash or other light source 120 to maintain substantially adequate illumination across multiple images. This may be useful since the ambient lighting can change significantly depending on the time of day or night and/or the weather conditions. By maintaining adequate lighting, some processing complications may be able to be avoided. In some embodiments, light sources 120 which are independent of the cameras 110 may be used in order to provide suitable illumination.

The camera 110 is usually positioned at a suitable angle to capture an image of the shaker screen 125. This may include the entire screen 125 or only a portion of the screen 125. Disclosed embodiments may capture an image of the screen 125 after it has been cleaned.

The angle Θ between the camera 110 and the shaker screen 125 can, if desired, be measured and recorded. Θ is, in some embodiments, between −60 and 60 degrees. In other embodiments, Θ may be between −45 and 45, −30 and 30, or −15 and 15 degrees. In some embodiments, Θ may be as large as 60, 75, 80, or 90 degrees. In other embodiments, Θ may be as small as 10, 5 or 0 degrees.

A shaker screen damage algorithm may be a trained algorithm that may include, for example, an image warping step, a cropping step, a feature extraction step, and a classification step. During image warping, the known camera parameters and view angle 0 are often used to warp the image of the shaker screen to simulate a zero degree look angle. Then the resulting warped image may, if desired, be cropped to any appropriate size, for example, the approximate size of the shaker screen 125.

Before or after warping and/or cropping, features may be extracted from, for example, the screen-regions of the image. These features are often extracted from regions, thereby creating a regular grid where each region is defined as being nPix1×nPix1. nPix1 is preferably chosen from between 5 pixels and ⅓rd the total image size based on overall algorithm performance on training data. In some embodiments, nPix 1 may be a single pixel, two pixels, or three pixels. Inter-grid sampling may also be used. Such sampling varies depending upon the equipment, applications, and desired results. In one embodiment, it employs sampling of nPix2×nPix2 regions, where nPix2 is chosen between 1 pixel and ⅕th the total image size based on the required real-time processing requirements.

Features extracted may include one or more of the following depending upon desired results: texture features, Fourier-domain features, angle and/or magnitude features (e.g., histogram of oriented gradient features, "HOG"), binary features (e.g., binary robust independent elementary features, "BRIEF"), and/or statistical descriptors of the pixel values (e.g., mean, standard deviation, kurtosis, principal component scores, and/or loadings). Other possible feature extraction techniques include, but are not limited to, scale invariant feature transform ("SIFT"), speeded-up-robust-features ("SURF"), Viola-Jones, ("V-J"), Haar wavelet, texture features (e.g., [Haralick 1973]), pre-trained deep convolutional neural networks (e.g., OverFeat [Sermanet, 2014]), or convolutional neural networks specifically trained on mud-shaker screen images or other reasonable image surrogates, and others. Suitable techniques are described in, for example, Pierre Sermanet, David Eigen, Xiang Zhang, Michael Mathieu, Rob Fergus, Yann LeCun: "OverFeat: Integrated Recognition, Localization and Detection using Convolutional Networks", International Conference on Learning Representations (ICLR 2014), April 2014, (OpenReview.net), (arXiv: 1312.6229) Robert M. Haralick, K. Shanmugam, and Its'hak Dinstein, "Textural Features for Image Classification", IEEE Transactions on Systems, Man, and Cybernetics, 1973, SMC-3 (6): 610-621 which references are incorporated by reference herein.

Preselected images may be used for updating and/or training the algorithm. Regions of the training images comprising a large number of images from damaged and undamaged screens 125 may be manually labeled as "damaged" either by an expert observer and/or automatically. The number of training images used may be as few as 1 or 10, or as many as 100, 1,000, 10,000, or as many as 1 million or more. During training, features from the labeled images may be combined with their corresponding labels (e.g., 1 if the feature was extracted from a damaged part of the screen, 0 otherwise), and this information may be used to train, for example, a support vector machine ("SVM") classifier or other appropriate classification algorithm (e.g, neural network, linear discriminant). Parameters of the classification procedure, including the decision threshold, may be optimized and overall system performance estimated using receiver operating characteristic ("ROC") curves based on the results of cross-validating the classification algorithm using cross-validation methods, e.g., leave-one-image-out and/or leave-one-collection-out cross-validation.

At run-time, the same process or a similar process may be applied to the current images collected of the shaker screen 125. The resulting outputs of the support vector machine classification run ("SVM run") on these features may then be aggregated, spatially or otherwise, into a "screen damage map". If desired, this map can be displayed visually and/or automatically used to estimate the percent of the screen that is damaged.

A screen 125 may need to be replaced or repaired if the percent of the screen 125 that is estimated to be damaged is above a certain threshold or if the damage is at a key location or is unacceptably severe making replacement and/or repair prudent. Of course, this may vary depending upon the system. For example, different rigs may have different such thresholds. Some embodiments of the system enable the operator to set a threshold anywhere between 0 and dMax % before issuing an alert. For many embodiments, dMax % should not be above 13%, or above 15%, or above 17%, or above 20% since much of the shaker's efficiency is lost at that point. In other embodiments, dMax % may be as low as 10%, 7%, 5% or 3%.

Similarly, it may be desired to replace a screen 125 if any single tear has an area greater than some pre-defined size (e.g., 25 $in^2$). A tear may be determined to be unacceptable if the tear is greater than 4 $in^2$, 8 $in^2$, 16 $in^2$, 25 $in^2$, or larger. The current system, in some embodiments, automatically estimates the area of damaged regions. This estimate may be compared against a pre-determined threshold for acceptable damage area. In these embodiments, the user may specify a largest-acceptable-tear-size threshold.

When the screen 125 requires replacing, alerts may be provided to the operator in the form of any of the following: locking the user interface with the text "Replace Screen" or a similar message on the operator's screen, text-message sent to pre-defined phone number(s), e-mail message sent to pre-defined e-mail address(es), or alert sounds or alarms on the rig among others. In some embodiments, automation may be employed to clean and/or replace the screen without operator involvement.

An alternate embodiment may also include an automated screen cleaning system 420. The automated cleaning system 420 could be directed to clean the shaker screen by periodically spraying water on the shaker screen 125 or using any other appropriate cleaning technique. In some embodiments, the automatic cleaning system 420 may be able to communicate when the screen 125 has been cleaned to the processor. This would allow the camera 110 to capture images of a shaker screen 125 when it is known to be clean without human interaction or oversight. The processor 115 could then analyze those images with or without informing an operator. If the shaker screen damage is determined to be within a pre-defined safety threshold, the system may either inform the operator or continue without informing the operator. Alternatively, the system could be configured to inform the operator every time such an analysis is performed, only when the screen damage is above a predetermined damage percent, or when prompted by the operator to display the most recent shaker screen damage percent. The system may also be configured to passively display the most recent determination of screen damage.

Yet another alternative embodiment may include identifying areas of the shaker screen 125 which have been clogged during operations and/or reduce the efficiency of the shale shaker screen 125. By identifying clogged or otherwise inefficient areas of the shale shaker screen 125, the system may be able to alert an operator to any necessary cleaning and/or repairs. A predetermined threshold of acceptable screen efficiency and/or a threshold of an acceptable percent of the screen 125 that is clogged may be determined. The system may then be configured to notify a user when the screen 125 is determined to be outside of any such threshold. The system may additionally initiate an automated cleaning procedure in response to an identified condition. The system may initiate an automated cleaning procedure in response to identifying the screen 125 as being clogged. If the cleaning does not unclog the screen 125, the system may then identify that clog as damage to the screen 125. The system may also, or alternatively, initiate an automatic cleaning procedure on a periodic basis regardless of the condition of the screen 125.

Another potential embodiment may involve mounting a scale 310 under the shaker screen 125. The weighing-surface of the scale 310 may be adjustable or may be fixed. The angle of the weighing surface may be level or may be angled, allowing material that passes through the shaker screen 125 to passively slide off of the scale 310 over time. Initially, a training screen may be used to calibrate the system. The training screen may be entirely undamaged, or selected to represent an acceptable or average amount of damage. As drilling mud or other material is allowed to pass through a training screen, the scale 310 may transmit real time data to a processor. The processor may analyze this data stream for anomalies which may indicate damage to the shaker screen 125 or other potentially adverse conditions. A sudden increase in weight may indicate a single large piece of material was allowed to pass through the screen 125, possibly indicating screen damage which requires urgent attention. A change in the rate of material accumulation on the scale 310 may indicate increasing general wear to the screen 125. A gradual decrease in the average weight on the scale 310 may indicate the screen 125 has become clogged and is allowing less material to flow through. These potential conditions may indicate cleaning, repair and/or replacement is necessary in the future or may require immediately attention. The angle of the weighing surface could be adjusted allowing material to slide off of the scale 310 at an adjustable rate. In a preferred embodiment the angle of the weighing surface would be adjusted such that the rate of material sliding off the weighing surface is approximately equivalent to the rate at which material passes through the screen 125, resulting in a substantially consistent amount of material being weighed by the scale 310 at any given time. The weighing surface of the scale 310 may be flat, as is common in many applications, or may be formed into a variety of shapes. In a preferred embodiment the weighing surface will be approximately trough shaped, thereby directing the flow of drilling mud in the desired direction.

FIG. 1 shows a potential embodiment of the system disclosed. This embodiment comprises two cameras 110 arranged to capture significantly different views of the fluid front 103 and drill cuttings 101 on the shaker table 105. This embodiment also utilizes distance sensing equipment 130. The cameras 110 and the distance sensing equipment 130 are connected to the processor 115 such that the captured images may be sent to the processor 115 and analyzed.

Figure 2:
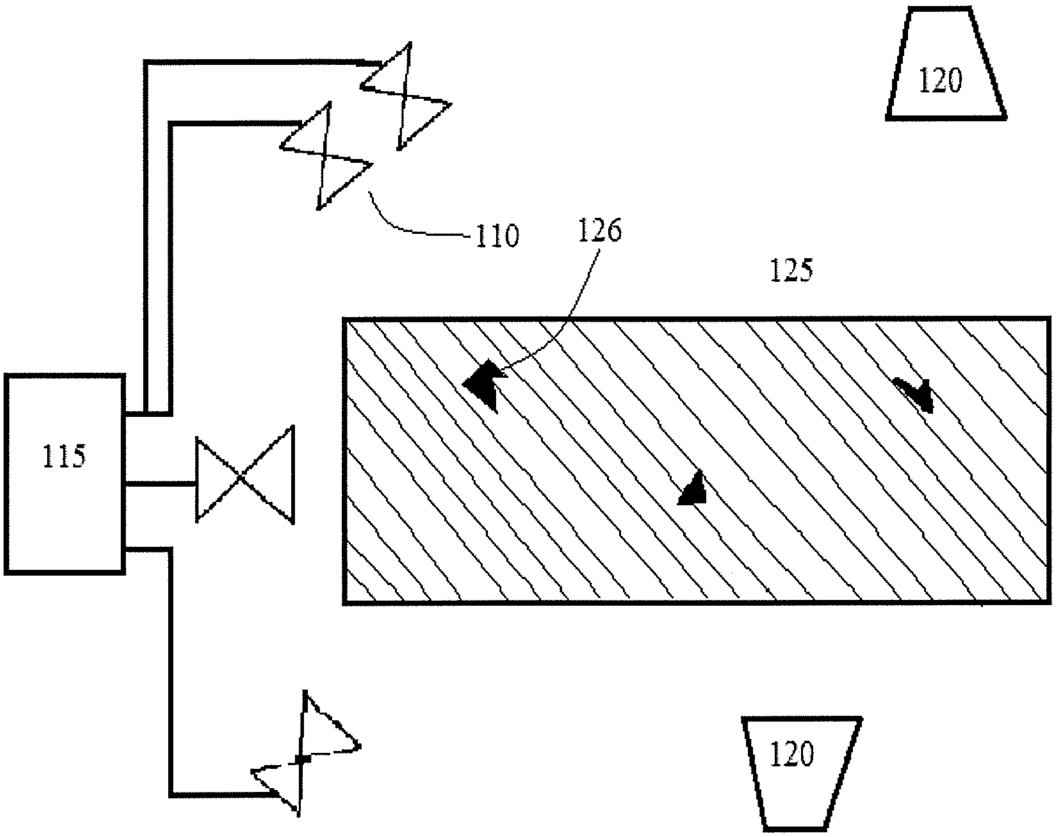
FIG. 2 a potential embodiment of the system showing stereo vision cameras and possible damage to a shaker screen.

FIG. 2 shows a potential embodiment of the disclosed system with emphasis on the shaker screen 125 and identified portions of the screen that are damaged 126. This embodiment also uses multiple remotely located light sources 120 in order to provide adequate illumination of the shaker screen 125 during all weather conditions and times of day.

The specific position of the cameras 110, distant sensors 130, and the like in relation to the shaker table in FIGS. 1 and 2 may vary depending upon many factors such as number of shaker decks and the desired application. For example, in FIGS. 1 and 2 the cameras may be placed anywhere along the shaker table or even at the opposing end of the shaker table where the drier portion of the shaker is located in many instances. This may be particularly advantageous for multi-deck shakers.

Figure 3:
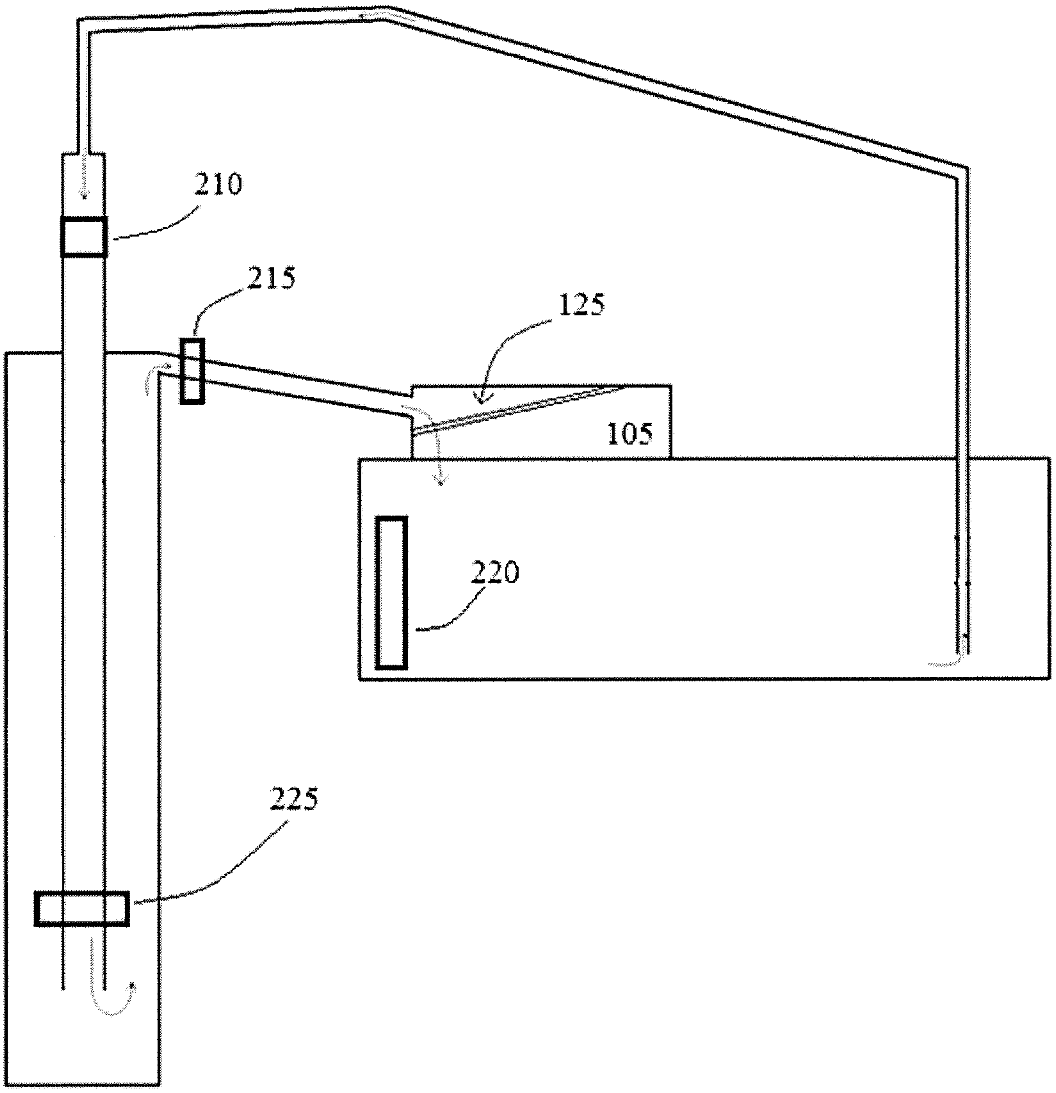
FIG. 3 depicts a typical well circulation system.

FIG. 3 shows a typical well circulation system 200 in which drilling fluid or mud may be pumped from a mud pit into a well bore. The mud is used to cool the drilling equipment as well as carry cuttings 101 up to the surface and deposit the cuttings on a shaker table 105. As the drilling fluid flows off of the shaker table 105, the fluid front 103 is formed. The fluid front location may vary depending on the angle and/or speed of the shaker table 105, the volume and rate of flow of the drilling fluid, and/or many other factors known in the art. The level of drilling mud in the pit may be detected using a pit volume sensor 220. The flow of mud entering the well bore may be detected using a well flow-in sensor 210. The flow of mud exiting the well may be detected using a well flow-out sensor 215. The depth of the drill bit may be detected using a bit depth sensor 225. The information gathered by these sensors and various combinations of this information may be integrated into the fluid front location analysis in order to provide a better understanding of the drilling operations and potential well conditions to an operator.

Figure 4:
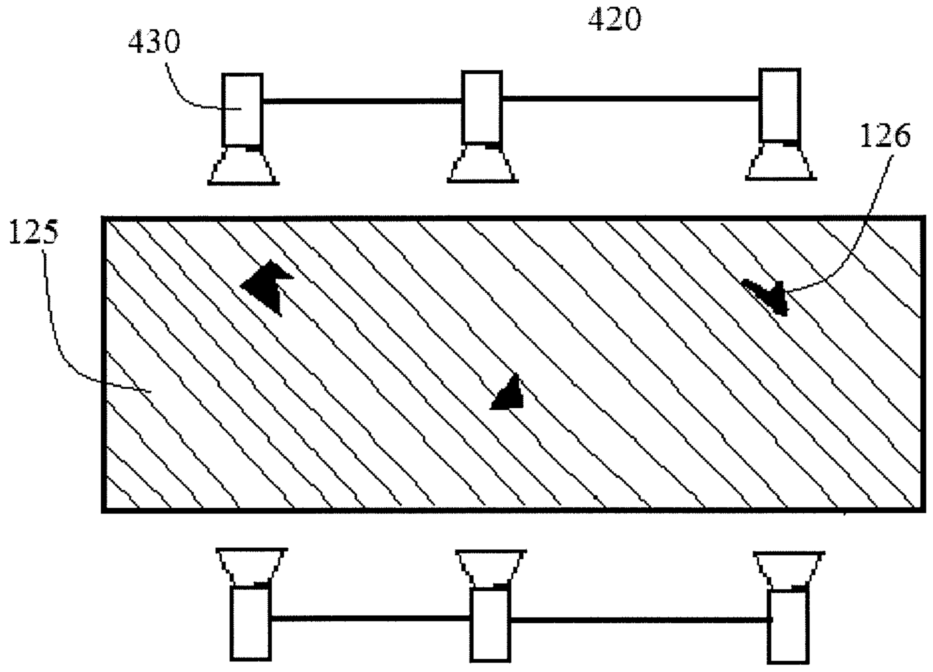
FIG. 4 shows one embodiment of an automated screen cleaning system.

FIG. 4 depicts a potential embodiment of an automated screen cleaning system 420. The embodiment uses multiple nozzles 430 to spray pressurized water on to the screen 125.

Figure 5:
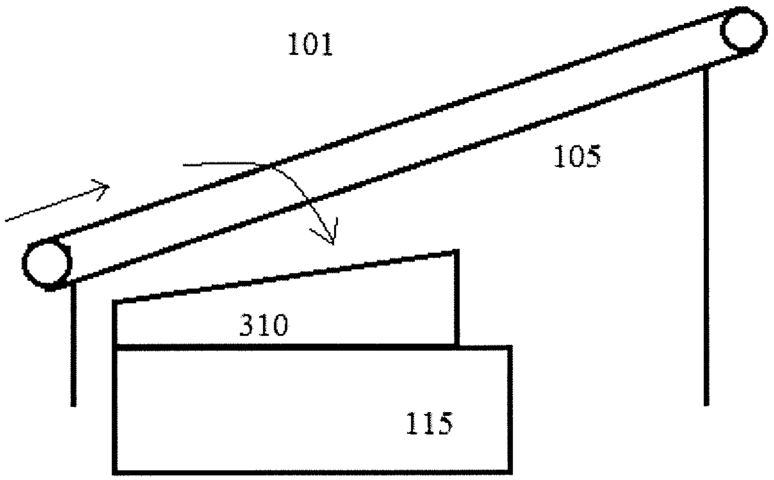
FIG. 5 shows an alternate embodiment using a scale to determine screen damage.

FIG. 5 depicts an alternative embodiment of the disclosed system which utilizes a scale 310 operably connected to a processor 115 in order to analyze the weight of drilling fluid and drill cuttings 101 as they pass through the shale shaker 105.

Figure 6:
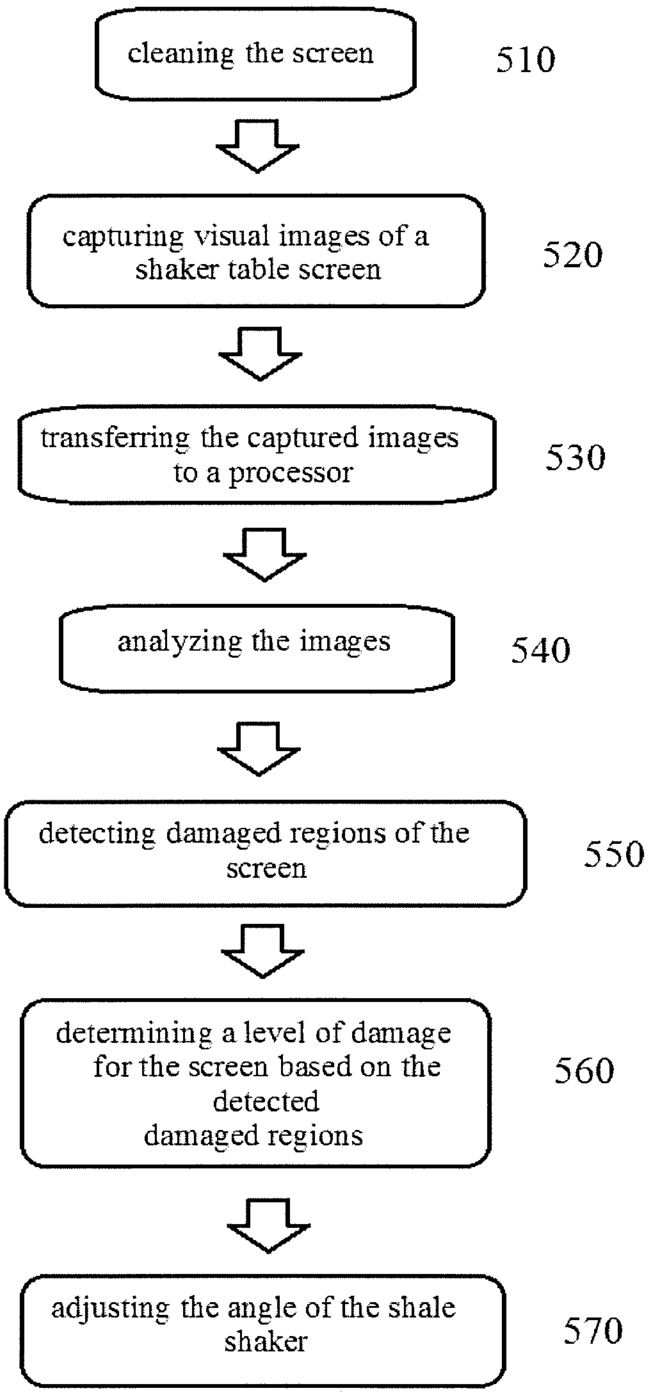
FIG. 6 shows a potential method of determining the damage level of a shale shaker screen.

FIG. 6 shows the steps of a potential method of determining the level of damage of a shaker screen 125 involving cleaning the screen 510, capturing visual images of a shaker table screen 520, transferring the captured images to a processor 530, analyzing the images 540, detecting damaged regions of the screen 550, determining a level of damage for the screen based on the detected damaged regions 560, and adjusting the angle of the shale shaker 570.

Disclosed embodiments may be used in combination with a variety of sensors related to a well circulation system 200 to provide context to the processor 115. This may help determine shaker screen damage and/or any other anomalous conditions and/or may reduce false positive alerts. All of the disclosed embodiments may be configured to operate with or without human involvement.

Disclosed embodiments relate to a system for replacing damaged shaker screens comprising a shale shaker screen 125 and at least one camera 110 operably connected to a processor 115, wherein the camera 110 is positioned to capture at least one image of at least a portion of the shale shaker screen 125 and the processor 115 is capable of receiving the image from the camera 110 and wherein the processor 115 is configured to analyze the image and detect damaged regions of the shale shaker screen 125. In some embodiments, the processor 115 is configured to determine when a screen 125 is damaged above a pre-defined threshold. The pre-defined damage threshold may be selected to ensure the desired shale shaker efficiency. The system may further comprise a shale shaker table 105, wherein the shale shaker screen 125 is attached to the shale shaker table 105 and at least one light source 120 arranged to provide adequate lighting during diverse weather conditions and times of day. In some embodiments, the processor 115 is capable of warping a captured image to simulate a 0-degree look angle. The processor 115 may also be capable of cropping an image such that the image comprises the desired portion of the shaker screen 125. The processor 115 may also be trained to detect damaged regions of the shale shaker screen 125 using at least one training image. The processor 115 may be trained using at least 10 images, at least 100 images, or at least 1,000 images. The system may further comprise a screen cleaning system 420.

Disclosed embodiments relate to a system designed to maintain shale shaker efficiency, the system comprising a shale shaker screen 125 and at least one camera 110 positioned to capture one or more images of the shaker screen 125, wherein the camera 110 is operably connected to a processor 115 and the processor 115 is capable of receiving said images of the shaker screen 125 from the camera 110 and wherein the processor 115 is configured to detect clogged sections of the shaker screen 125. The system may further comprise a shale shaker table 105 wherein, the screen 125 is attached to the shale shaker table 105 and/or an automated screen cleaning system 420. In some embodiments, the processor 115 is configured to determine the shaker screen efficiency based on the number of clogged sections of the screen 125.

Disclosed embodiments relate to a method for analyzing shaker table screen damage, the method comprising the steps of capturing visual images of a shaker table screen 125 using a camera 110, transferring the images to a processor operably connected to the camera 110, analyzing the images using the processor 115, wherein the processor 115 is configured to analyze the images and detect damaged regions of the screen 125, and determining a level of damage for the screen 125 based on the detected damaged regions.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

What is claimed is:

1. A system for analyzing shaker screens comprising:

a processor; and at least one camera operably connected to the processor, wherein the camera is positioned to capture at least one image of at least a portion of a shale shaker screen on a shaker table and wherein the processor is configured to:

receive visual data from the at least one camera;

analyze the visual data in order to detect damage to the shale shaker screen on the shaker table;

determine whether a percentage of the shale shaker screen that is damaged exceeds a predefined first threshold;

determine whether a single tear of the detected damage has an area greater than a predefined second threshold, wherein the predefined first threshold is different from the predefined second threshold;

determine a location of the single tear on the shale shaker screen and whether the location of the single tear is at a predefined location; and provide an alert to an operator in response to at least one of (i) determining the location of the tear is at the predefined location, (ii) determining that the percentage of the shale shaker screen that is damaged exceeds the predefined first threshold, or (iii) determining that the area of the single tear exceeds the predefined second threshold.

2. The system of claim 1, wherein the predefined first threshold is from greater than 0% to 20%.

3. The system of claim 1, wherein the predefined second threshold is from 4 $in^2$ to 25 $in^2$.

4. The system of claim 1, wherein the processor is configured to provide the alert by at least one of locking a user interface with a message on a screen of the user interface, sending a text message to a predefined phone number, sending an email message to a predefined email address, providing an audible alarm, providing a visual alarm, or activating an alert or alarm on a drilling rig.

5. The system of claim 1, wherein the processor is further configured to cause automation to clean or replace the screen in response to at least one of determining that the percentage of the shale shaker screen that is damaged exceeds the predefined first threshold or determining that the area of the single tear exceeds the predefined second threshold.

6. The system of claim 1, wherein the processor is further configured to determine a screen efficiency of the shaker screen based on the visual data and provide an efficiency alert responsive to the determined screen efficiency being outside of a predefined third threshold.

7. The system of claim 1, wherein the processor is further configured to obtain weight data of the shaker screen from at least one sensor under the shaker screen, monitor a rate of change of weight based on the weight data, and provide a weight alert responsive to the monitored rate of change of weight being outside of a predefined weight threshold.

8. A method comprising:

obtaining, by a processor, visual data from a camera positioned to capture at least one image of at least a portion of a shale shaker screen on a shaker table;

analyzing, using the processor, the visual data and detecting, using the processor, damage to the shale shaker screen on the shaker table based on the analysis of the visual data;

determining, using the processor, whether a percentage of the shale shaker screen that is damaged or clogged exceeds a predefined first threshold;

determining, using the processor, whether a single tear of the damage to the shale shaker screen has an area greater than a predefined second threshold;

determining, using the processor, a location of the single tear on the shale shaker screen and whether the location of the single tear is at a predefined location; and providing an alert to an operator in response to at least one of (i) determining that the location of the single tear is at the predefined location, (ii) determining that the percentage of the shale shaker screen that is damaged or clogged exceeds the predefined first threshold, or (iii) determining that the area of the single tear exceeds the predefined second threshold.

9. The method of claim 8, further comprising automatically cleaning the shaker screen in response to at least one of determining that the percentage of the shale shaker screen that is damaged or clogged exceeds the predefined first threshold or determining that the area of the single tear exceeds the predefined second threshold.

10. The method of claim 8, wherein the predefined first threshold is from greater than 0% to 20%.

11. The method of claim 8, wherein the predefined second threshold is from 4 $in^2$ to 25 $in^2$.

12. The method of claim 8, wherein providing the alert comprises at least one of locking a user interface with a message on a screen of the user interface, sending a text message to a predefined phone number, sending an email message to a predefined email address, or activating an alert or alarm on a drilling rig.

13. The method of claim 8, further comprising determining a screen efficiency of the shaker screen based on the visual data and providing an efficiency alert responsive to the determined screen efficiency is outside of a predefined third threshold.

14. The method of claim 8, further comprising obtaining weight data of the shaker screen from at least one sensor under the shaker screen, monitoring a rate of change of weight based on the weight data, and providing a weight alert responsive to the monitored rate of change of weight being outside of a predefined weight threshold.

15. A non-transitory computer readable storage medium comprising a plurality of instructions executable by one or more data processors, the instructions comprising instructions which, when executed on the one or more data processors, cause the one or more data processors to perform actions including:

obtaining, by a processor, visual data from a camera positioned to capture at least one image of at least a portion of a shale shaker screen on a shaker table;

analyzing, using the processor, the visual data and detecting, using the processor, damage to the shale shaker screen on the shaker table based on the analysis of the visual data;

determining, using the processor, whether a percentage of the shale shaker screen that is damaged or clogged exceeds a predefined first threshold;

determining, using the processor, whether a single tear of the damage to the shale shaker screen has an area greater than a predefined second threshold;

determining, using the processor, a location of the single tear on the shale shaker screen and whether the location of the single tear is at a predefined location; and providing an alert to an operator in response to at least one of (i) determining that the location of the single tear is at the predefined location, (ii) determining that the percentage of the shale shaker screen that is damaged or clogged exceeds the predefined first threshold, or (iii) determining that the area of the single tear exceeds the predefined second threshold.

16. The non-transitory computer readable storage medium of claim 15, wherein the instructions further comprise instructions which, when executed on the one or more data processors, cause the one or more data processors to perform actions including providing the alert by at least one of locking a user interface with a message on a screen of the user interface, sending a text message to a predefined phone number, sending an email message to a predefined email address, or activating an alert or alarm on a drilling rig.

17. The non-transitory computer readable storage medium of claim 15, wherein the predefined first threshold is from greater than 0% to 20%.

18. The non-transitory computer readable storage medium of claim 15, wherein the predefined second threshold is from 4 $in^2$ to 25 $in^2$.

19. The non-transitory computer readable storage medium of claim 15, wherein the instructions further comprise instructions which, when executed on the one or more data processors, cause the one or more data processors to perform actions including determining a screen efficiency of the shaker screen based on the visual data and providing an efficiency alert responsive to the determined screen efficiency is outside of a predefined third threshold.

20. The non-transitory computer readable storage medium of claim 15, wherein the instructions further comprise instructions which, when executed on the one or more data processors, cause the one or more data processors to perform actions including obtaining weight data of the shaker screen from at least one sensor under the shaker screen, monitoring a rate of change of weight based on the weight data, and providing a weight alert responsive to the monitored rate of change of weight being outside of a predefined weight threshold.

21. A system for replacing damaged shaker screens comprising:

a processor; and at least one camera operably connected to the processor, wherein the camera is positioned to capture at least one image of at least a portion of a shale shaker screen on a shaker table and wherein the processor is configured to:

obtain visual data from the camera;

obtain weight data from at least one sensor under the shaker screen;

analyze the visual data in order to detect a location of damage to the shale shaker screen on the shaker table and whether the location of the damage is at a predefined location;

analyze the weight data in order to detect a rate of change of weight of the shale shaker screen; and provide an alert to an operator in response to at least one of determining that the location of the damage to the shale shaker screen is at the predefined location or determining that the rate of change of weight is outside of a predefined second threshold.

22. The system of claim 21, wherein the processor is further configured to predict a condition of the shaker screen based on the detected damage and the detected rate of change of weight.

23. The system of claim 21, wherein the processor is further configured to generate a control response for changing an angle of the shaker screen responsive to determining that the rate of change of weight exceeds the predefined second threshold.

24. The system of claim 21, wherein the processor is further configured to determine whether a single tear of the detected damage has an area greater than a predefined second threshold, and to provide the alert in response to determining that the area of the single tear exceeds the predefined second threshold.

25. The system of claim 21, wherein the processor is configured to estimate clogging of the shaker screen in response to determining that the rate of change of weight is decreasing and to estimate wear of the shaker screen in response to determining that the rate of change of weight is increasing.

* * * * *